June 16, 1959 — K. H. EVERT — 2,890,723
MULTIPLE WALLED FLEXIBLE TUBING
Filed Dec. 1, 1953
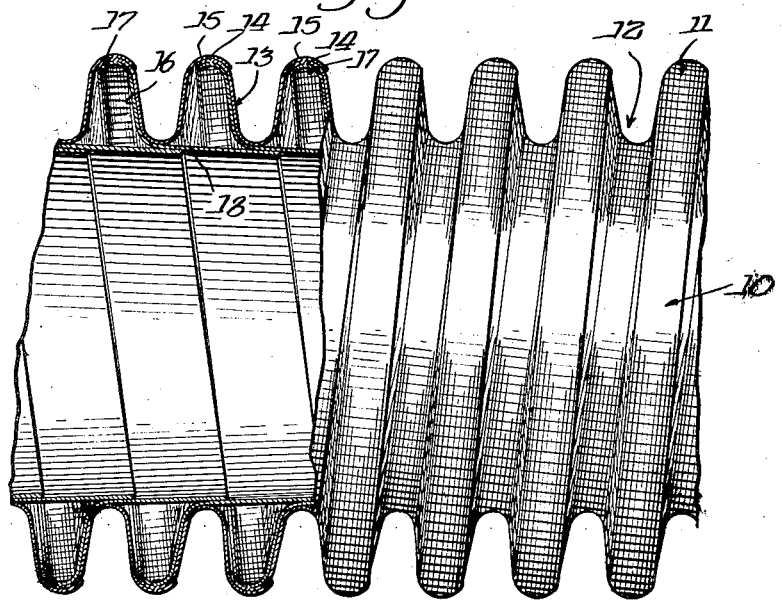
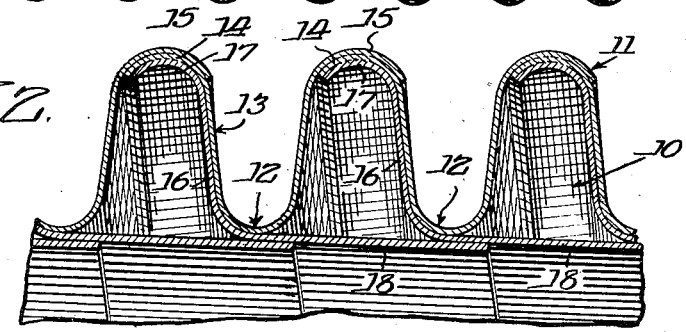
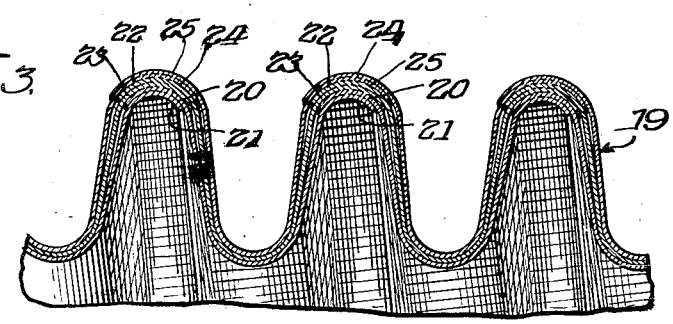
Inventor.
Karl H. Evert.

United States Patent Office 2,890,723
Patented June 16, 1959

2,890,723

MULTIPLE WALLED FLEXIBLE TUBING

Karl H. Evert, Bartlett, Ill.

Application December 1, 1953, Serial No. 395,416

5 Claims. (Cl. 138—51)

My invention relates to a flexible metal tubing and has particular reference to flexible metal tubing of the usual corrugated type and in which a plurality of strips of metal are profiled into suitable form and thereafter spirally wound about a mandrel in superimposed relation with each other, with the adjacent edges in overlapped relation particularly at the crowns of the corrugations making up the tubing where the strips are welded together, thereby providing a flexible tubing having extra thicknesses of metal at the crowns as distinguished from the usual form of flexible tubing, and which has unusual strength and long wearing qualities and is able to withstand unusual internal and external pressures, and also unusual external stresses to which the tubing may be subjected and yet it retains the flexibility of the usual single-walled metal tubing.

Another object of my invention is the provision of a flexible metal tube in corrugated form in which profiled strips of metal having arcuate extensions thereon are wound about a mandrel, with the adjacent arcuate extensions of the metal being overlapped particularly to form the crowns of the corrugations, and an additional profiled strip of metal simultaneously wound about the mandrel in superimposed relation with the first strip, whereby the metal is rolled into a tube of corrugated form having extra thicknesses of metal at the crowns of the corrugations and which is thereafter welded together by appropriate welding apparatus such as is shown in my co-pending application, Serial No. 395,415, filed December 1, 1953, now Patent No. 2,776,360, granted Jan. 1, 1957, which discloses the apparatus and means and in the main the contour of some of the strips of metal used basically in making the flexible tube of this present invention.

Another and further object of my invention is the provision of a flexible metal tube in which the crowns of the corrugations are formed of at least three strips of material welded together, thereby adding material strength to the tube by the inclusion of a second strip of profiled metal to the usual combination, or which may be a duplicate of the original profiled strip of metal but which is superimposed upon a single strip of material and the two strips welded together at the crowns of the corrugations, in this instance producing a double-walled corrugated flexible tube for unusual installations where great strength and long life are concerned and where the tube is subject to considerable flexibility, vibration, and the like.

Another and further object of my invention is the provision of a flexible metal tube in which an inner profiled strip of metal is shaped in such fashion that it can be fitted along one of its edges into the welded joint at the crowns of the corrugations, and the opposite edge of the inner strip becomes a trailing edge which is of sufficient width to span the throat of the adjacent corrugation inside of the tubing, thereby producing a flexible metal tube of corrugated form having a substantially smooth lining and providing an interior channel therethrough through which the gases, and the like, which are being conveyed by the flexible tubing may readily pass without the friction losses common in flexible tubing where the gases fill the entire space inside of the flexible tubing, including the channels formed by the corrugations, thereby preventing a free flow of gases, and the like, through the flexible tubing.

Another and further object of my invention is the provision of a flexible tube having an internal liner therein which is so constructed as a part of the tubing that complete flexibility of the tubing is maintained with the lining being capable of flexure as the tube is bent so that it conforms to the inside wall and presents a smooth inside wall surface for the flexible tube.

These and other objects of my invention will be better and more fully understood by reference to the accompanying sheet of drawings, and in which—

Fig. 1 is a view of a section of a flexible tube partially in section and partially in elevation embodying my invention.

Fig. 2 is a detailed view of a portion of the tube illustrating particularly the corrugations shown in Fig. 1, and Fig. 3 is a view of a section of a flexible tube having a triple wall instead of the usual single wall.

Referring now specifically to the drawings and in which like reference characters refer to like parts throughout, a flexible tube 10 is shown having the usual crowns 11, 11 forming a part of the external corrugations, and valleys 12, which are common with tubes of this type, these portions being formed by profiled metal of the form shown in my co-pending application, Serial No. 395,415, filed December 1, 1953, now Patent No. 2,776,360, granted Jan. 1, 1957, and which consists generally of a strip of metal of a U form 13 generally having depending arcuate shaped flanges 14 and 15 along each of its marginal edges. A pre-fabricated strip of material is passed through a machine having a series of rollers and profiled into the form shown, which is well known in the art and which forms no part of my present invention. The profiled strip thus formed is thereafter fed diagonally into another machine having a mandrel such as disclosed in my application above identified, where the strip is formed into a continuous tube and the arcuate flanges 14 and 15 of the metal strip are overlapped into the form shown in elevation in Fig. 1 of the drawing of the above-identified co-pending application and welded together at the crowns 11, 11 instead of at the valleys 12 of the tube, as has been the common practice in the manufacture of flexible tubes of this type. Another strip of metal generally of U shape is provided which consists substantially of a leg portion 16, an arcuate edge portion 17, and a trailing edge portion 18, which is fed onto the mandrel prior to the profiled strip 13 of metal heretofore described, with the arcuate edges of the profiled strip 13 being overlapped over the arcuate edge 17 of the second mentioned strip of metal at the crown portion of the tube and the three thicknesses of metal passed over an electric welding apparatus so that the three thicknesses of metal are welded together at the crowns of the corrugations into an integral structure, with the depending edges 18 extending forwardly of the rolls so that they span the throat of the adjacent corrugation instead of the one in which the member 16 is positioned and extend to a point approximately at the entrance of the throat of the next succeeding corrugation, thereby overlapping the trailing edge 18 of the next succeeding liner and presenting a substantially smooth interior for a flexible tube through which gases and the like can pass without being impeded by the corrugations on the internal portion of the tube. I am thereby able to provide a tube which is substantially smooth in its internal surface but which possesses materially added strength and allows the lining to flex and conform to the curvature of the main body of the tube without gaps or openings therein which would impede the flow of gases therethrough.

In Fig. 3 of the drawings a modified form of tube is shown for extremely heavy duty in which the walls of the tube and the valleys thereof are made of triple thicknesses of material of separate strips having overlapped edges at their crowns and welded together, thereby forming a tube with heavy crowns and capable of withstanding greater pressures than that to which normal single-walled flexible tubes are subjected. In the making of this tube a slightly modified form of rolling mechanism than that shown in my co-pending application, Serial No. 395,415, filed December 1, 1953, now Patent No. 2,776,360, granted Jan. 1, 1957, could be used by the addition of two additional sets of forming rollers such as 18 and 19, as shown in Fig. 1 of the drawings of the above application, and of other holding rollers at the top of the tube. The tube designated as a whole as 19 is formed by making an inner tube of a U-shaped strip of material having curved flanges 20 and 21 along each of its edges, which is spirally wound about a mandrel, with the edges 20 and 21 being overlapped at the crowns of the tube 19. Thereafter a second strip of U-shaped material having flanges 22 and 23 at each side thereof is superimposed upon the first formed member and held in position by suitable rolls, with the flanges 22 and 23 being overlapped at the crowns of the tube 19 and over the overlapped flanges 20 and 21, which forms an intermediate wall of the tube 19. An outer wall is provided by a third U-shaped member having flanges 24 and 25 thereon which is spirally wound about the intermediate wall member, with the flanges 24 and 25 being overlapped at the crowns of the tube 19 where the overlapped flanges of the three units are passed between two welding rollers such as illustrated and described in my co-pending appliciation herein identified, and welded together into a unit possessing greater strength than a single-walled unit.

While I have described more or less precisely the details of construction, I do not wish to be understood as limiting myself thereto, as I contemplate changes in form, the proportion of parts and the substitution of equivalents as circumstances may suggest or render expedient without departing from the spirit or scope of my invention.

What is claimed is:

1. A thin multiple walled flexible tube in corrugated form composed of a plurality of strips of profiled metal in superimposed relation with respect to each other and having overlapped adjacent edges and welded together at the said overlapped edge portions of the said strips each wall being continuous throughout the length of the tube.

2. A thin multiple walled flexible tube in corrugated form composed of a plurality of strips of metal each strip profiled in substantially U-shape in cross section and having arcuate flange portions along each of their sides, in spiral form in superimposed relation with each other into external-crown portions with valleys therebetween whereby the contiguous flange portions are in overlapped relation with each other at the crown portions, the said overlapped flanges being welded together to form an integral elongated tubular structure each wall being continuous throughout the length of the tube.

3. A thin multiple walled flexible tube in corrugated form having external crown portions with valleys therebetween and composed of a plurality of strips of metal each strip profiled in substantially U-shape in cross section and having arcuate flnage portions along each of their sides with the contiguous flange portions of each strip in overlapped relation at the crowns of the corrugations, the said overlapped flanges being welded together at the crowns thereof to form an integral elongated tubular structure with each wall being continuous throughout the length of the tube and separate from the adjacent wall except at the crowns of the tube.

4. A thin walled flexible metal tube in corrugated form comprising spaced crown portions with valleys therebetween comprising spaced crown portions with valleys therebetween comprising a single strip of profiled metal generally U-shaped in cross section having curved flange portions on each side thereof wound into tubular form with contiguous flange portions in overlapped relation and a liner having a semi-U-shaped portion with a curved flange along one side and a trailing edge portion, the curved flange of the liner being at the crown of the corrugations and welded with the said crown portions into an elongated tube form with the trailing edge portion wound into spiral form to provide a liner for the elongated tube.

5. A thin walled flexible metal tube in corrugated form comprising spaced crown portions with valleys therebetween comprising a single strip of profiled metal generally U-shape in cross section having curved flange portions on each side thereof wound into tubular form with the contiguous flange portions in overlapped relation at the crown portions of the tube and a liner having a semi-U-shaped portion having a curved flange along one side and a trailing edge portion, the curved flange being spirally wound with one flange of the profiled strip of metal at the crown of the corrugations and welded with the overlapped flange portions of the profiled strip at the crown of the corrugations into an elongated tube, with the trailing edge portion of the liner wound into spiral form to provide a liner for the elongated tube whereby the said liner is secured to the tube in a line contact at the crown of the corrugations and, free to flex with the said tube.

References Cited in the file of this patent

UNITED STATES PATENTS

| | | |
|---|---|---|
| 1,474,949 | Sundh | Nov. 20, 1923 |
| 1,598,872 | Palmer | Sept. 7, 1926 |
| 2,191,690 | Witzenmann | Feb. 27, 1940 |
| 2,240,210 | Dreyer | Apr. 29, 1941 |
| 2,444,008 | Fentress | June 22, 1948 |

FOREIGN PATENTS

| | | |
|---|---|---|
| 24,125 | Great Britain | Nov. 6, 1903 |
| 254,901 | Switzerland | Jan. 17, 1949 |